United States Patent [19]

Takinishi et al.

[11] 4,334,542

[45] Jun. 15, 1982

[54] ARTIFICIAL PALATE DEVICE FOR ELECTROPALATOGRAPH

[75] Inventors: Kiyotoshi Takinishi, Koganei; Masato Nakamura, Fuchu, both of Japan

[73] Assignee: Rion Co., Ltd., Tokyo, Japan

[21] Appl. No.: 148,171

[22] Filed: May 8, 1980

[30] Foreign Application Priority Data

May 10, 1979 [JP] Japan .................................. 54/57341
Aug. 23, 1979 [JP] Japan ................................ 54/107377

[51] Int. Cl.³ .......................... A61B 5/10; G09B 19/04
[52] U.S. Cl. .................................... 128/642; 128/777; 128/787; 128/798; 434/185
[58] Field of Search ................................. 128/639–644, 128/787, 798, 777; 434/185

[56] References Cited

U.S. PATENT DOCUMENTS

| | | | |
|---|---|---|---|
| 1,967,815 | 7/1934 | Freiberg | 128/787 |
| 3,572,322 | 3/1971 | Wade | 128/640 |
| 3,888,240 | 6/1975 | Reinhold, Jr. et al. | 128/644 |
| 4,112,596 | 9/1978 | Fletcher et al. | 434/185 X |
| 4,121,573 | 10/1978 | Crovella et al. | 128/640 |
| 4,166,465 | 9/1979 | Esty et al. | 128/798 X |
| 4,175,338 | 11/1979 | Takinishi et al. | 434/185 X |
| 4,233,987 | 11/1980 | Feingold | 128/639 |

FOREIGN PATENT DOCUMENTS

2337321 2/1974 Fed. Rep. of Germany ...... 128/639

OTHER PUBLICATIONS

Pickard, R. S. et al. *Med. & Biol. Eng. & Comput.*, 1979, 17, 261–267.
*The Lancet*, May 16, 1964, p. 1082.
Fletcher, S. G. et al., *J. Speech & Hear. Res.*, vol. 18, No. 4, (Dec. 1975).

*Primary Examiner*—Kyle L. Howell
*Attorney, Agent, or Firm*—Leydig, Voit, Osann, Mayer & Holt, Ltd.

[57] ABSTRACT

An artificial palate device of electropalatographs for electrically detecting and observing dynamic patterns of linguapalatal contacts during speeches by means of many tongue-contact sensing electrodes provided on a tongue-contacting surface of the device fitted intimately to the surface of hard palate of trainees of articulation study and speech training. The electrodes and lead wires connecting the electrodes to an electropalatograph display device are provided on a surface of base board preliminarily prepared with a flat, electrically insulative and flexible plate material and in a shape intimately adaptable when curved to the hard palate. As required, a flat metal foil easily deformable in sectional shape and retainable in its deformed shape is laminated in the other surface of the base board. The lead wires and metal foil are covered by an insulative layer.

6 Claims, 9 Drawing Figures

ARTIFICIAL PALATE DEVICE FOR ELECTROPALATOGRAPH

This invention relates generally to artificial palate devices for use in electropalatographs and, more particularly, to improvements in the artificial palate device provided with electrodes for electrically detecting dynamic patterns of linguapalatal contacts at the time of phonations as fitted intimately to the hard palate of a trainee for the purpose of performing articulation study and speech training of articulatory handicapped persons, foreign language students or the like persons.

The electropalatograph is a device wherein linguapalatal contact modes during phonations and speeches are electrically detected and indicated or recorded as an actual time pattern to continuously observe the contact mode during the phonation and speech of the trainee and to train him in the articulation and accurate speech while, if required, comparing the pattern with a pattern of standard linguapalatal contact mode in correct phonation or speech. It is necessary, therefore, that the artificial palate device for use in the electropalatograph is of a shape and size as close as possible to those of the hard palate of each trainee so that a correct linguapalatal contact mode as natural as possible can be achieved and observed. The electrodes for electrically detecting the contact modes comprise a plurality of minute sensing electrodes substantially evenly distributed over one of both surfaces with which the trainee's tongue contacts of the artificial palate which is usually made of such electrically insulating material as a synthetic resin and having a shape which can be fitted intimately to the trainee's hard palate, and the same number of lead wires connected respectively to these electrodes are extended from both side ends of a part of the artificial palate corresponding to the innermost position of the hard palate when the artificial palate is fitted thereto and are connected at extended ends to respective terminals in socket members for connecting them in a predetermined order to an electropalatograph display device. In performing the observation for the articulation study or the like, the artificial palate is fitted to the hard palate of the trainee, the respective sockets of the lead wires generally bunched to be two cords which are let out of both side ends of the trainee's mouth are connected to input and output terminals of the electropalatograph display device, a pulse of a low voltage is applied to the hard palate of the trainee through an electrode provided, for example, on the other surface of the artificial palate on the side to be in contact with the hard palate or any other proper means, the pulse voltage also applied to the tongue through the hard palate is transmitted to certain ones of the plurality of electrodes with which the tongue contacts at the time of the phonation, and the distribution of these contacted electrodes, that is, actual linguapalatal contact mode is detected by means of pulse signals provided through the contacted electrodes to the electropalatograph display device and is indicated or recorded.

Because of the necessity that the shape and size of the artificial palate must be made close to those of the hard palate of individual trainee as described above, in making the artificial palate device, a mold of the hard palate of the trainee has been taken and the artificial palate body has been made with it. This process shall be described with reference to FIGS. 1A to 1C. First of all, a female mold of the hard palate of individual trainee is taken and a gypsum mold D shown in FIG. 1A is made with this female mold. Such electrically insulating material as, for example, as instantaneously polymerizable resin is poured generally to be about 0.5 mm. thick on the surface area of the mold inside the tooth row, which area corresponding to the hard palate surface with which the tongue of the trainee will contact when phonations are made, to prepare such artificial palate shell 1 as shown in FIG. 1B. In such case, a pair of holding wires 2 of a diameter of about 0.5 mm. are preliminarily wound on the outer peripheries of the right and left innermost teeth and are embedded at the inside ends in the shell 1, so that the artificial palate can be held in the position of close contact with the hard palate of the trainee by means of the wires 2 fitted to the particular teeth. Then, many through holes of a diameter of about 1 mm. are provided at desired intervals substantially over the entire surface of the thus obtained shell. Further, as shown in FIG. 1C, sensing electrodes 3 which are, for example, gold tips of a diameter of about 1 mm. are inserted respectively through each of these through holes and are fixed so that both surfaces of each electrode will be exposed on both surfaces of the shell 1. Thereafter, lead wires are provided to respectively connect these electrodes with the electropalatograph display device. As seen in FIG. 1C, a plurality of insulation coated lead wires 4 are connected respectively at one end to one surface of the respective sensing electrode 3 on the convex side of the shell, that is, on the side to contact the hard palate of the trainee, the wires 4 are then bonded along the surface of the shell 1, are collected as divided respectively to the right and left rear side ends of the shell 1 in which the holding wires 2 are embedded and are led out of the shell as two lead wire bundles or cords 5, as the most general lead wire connecting manner. As another connecting manner, for example, the sensing electrodes 3 arranged as mentioned above are provided through a flexible insulating material base board prepared in advance so as to be adaptable to average palate shape and size, the respective lead wires 4 and their terminals, the latter of which are arranged in positions along the right and left rear side end edges of the base board, are provided by means of a proper print wiring technique on one surface of the substrate, then the thus prepared printed board with the electrodes and lead wires is placed and adhered over the same convex surface as in the above case of the shell 1 separately prepared as described with reference to FIGS. 1A and 1B and having the through holes with the hard palate so as to have the respective sensing electrodes 3 passed through each through holes and exposed on the surface of the shell 1 with which the trainee's tongue is to contact, a plurality of insulation coated lead wires for connecting the terminals on the board with the electropalatograph display device are connected respectively at one end to the terminals and then an insulating material coating is applied to the base board surface to cover the printed electrodes, their lead wires as well as terminals and wires connected to the terminals at their part placed on the board, and to render the board and shell integral with each other.

In either case, it is necessary that, as described above, the gypsum mold of the hard palate of individual trainee must be first taken, the shell of artificial palate has to be made on the basis of this mold and then the electrodes and their lead wires should be provided, so that there have been defects that the manufacturing step is complicated and the manufacturing cost is high. In the above described manufacture using the print wiring technique, the manufacture is simplified to some extent and the cost is reduced in respect of setting the electrodes and lead wires but the manufacture is not simplified and the cost is not reduced in respect of making the gypsum mold and shell. In other words, in making conventional artificial palate devices for electropalatographs, manual works for the preparations of gypsum mold of the hard palate of the individual trainee and of the shell based on it are indispensable and the time and cost required thereby for the manufacture have not been able to be reduced. The present invention has been suggested in view of such conventional defects.

A primary object of the present invention is, therefore, to provide an artificial palate device for electropalatograph which can be made at a low cost through simpler steps without requiring any gypsum mold of the hard palate of the individual trainee.

A related object of the present invention is to provide an artificial palate device for electropalatograph which requires no gypsum mold of the hard palate, yet can be fitted intimately to the hard palate of trainees when used and can attain a contact of the hard palate with a tongue as naturally as possible as required in the electropalatograph.

Other objects and advantages of the present invention will become clear upon reading the following explanation of the invention detailed with reference to preferred embodiments shown in the accompanying drawings, in which:

FIGS. 1A to 1C show a conventional manner in which an artificial palate device for electropalatographs is manufactured, in which FIG. 1A is a perspective view of a gypsum mold of the hard palate taken from a specific trainee;

FIG. 1B is a plan view of a shell of the conventional artificial palate device made on the basis of the mold of FIG. 1A and FIG. 1C is a perspective view of a completed artificial palate device showing the shell of FIG. 1B as provided with sensing electrodes and lead wires, with a part of the lead wires shown as omitted;

While the present invention is explained in the followings with reference to the illustrated embodiments, it is not intended to limit the present invention only to the particular embodiments but rather to include all modifications, alterations and equivalent arrangements possible within the scope of appended claims.

Figure 1A:
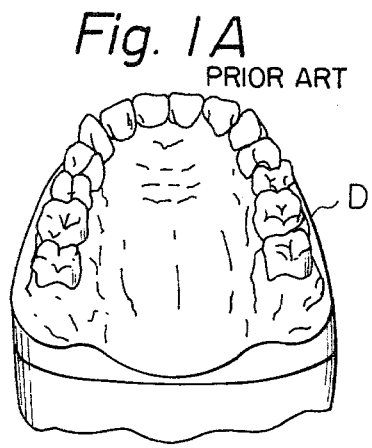
Figure 1B:
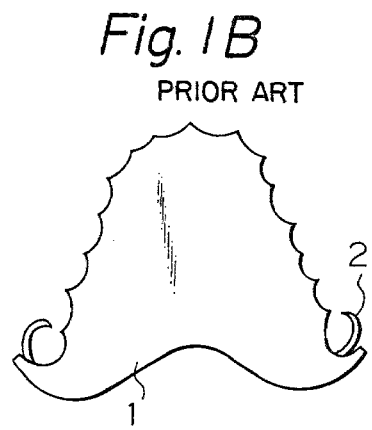
Figure 1C:
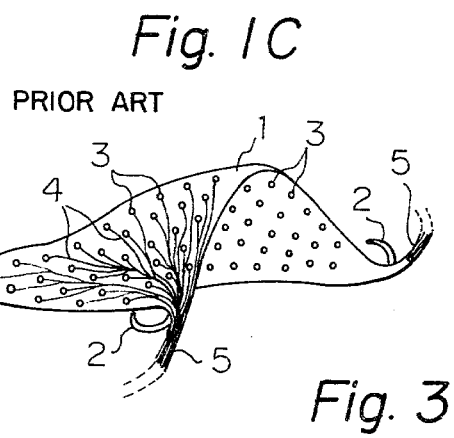
Figure 2:
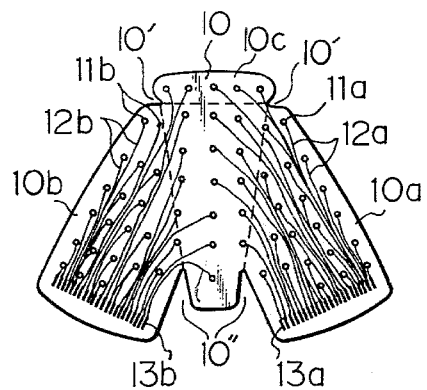
FIG. 2 is a plan view of a base board member as developed to be used in an embodiment of the artificial palate device according to the present invention.

Referring now to the preferred embodiment of FIGS. 2 to 5, a flat base board member 10 of a shape as developed of hard palate surface of a general or average shape and size as shown in FIG. 2 is made initially according to the present invention with such nontoxic, electrically insulating and flexible plastic sheet as, for example, of a polyester or soft polyvinyl chloride and having a thickness of about 25 to 50 microns. This base board member 10 has, therefore, substantially a symmetrical trapezoid shape rounded as a whole and is further provided in the illustrated case with small incisions 10' symmetrical with each other with respect to a vertical axis passing through the centers of the top and bottom sides on both lateral sides of the top side which is to be positioned inside the front teeth when fitted to a trainee's hard palate and with comparatively large incisions 10" extending from the bottom side toward the top side also symmetrically with respect to the vertical axis and adjacent the center of the bottom side which is to be positioned substantially between the right and left innermost upper teeth of the trainee. These incisions 10' and 10" are provided for allowing a tip portion 10c adjacent the top side of the trapezoid shape to be gradually smoothly bent substantially along the line connecting the respective bottoms of the small incisions 10' across the axis, as well as both right and left wing-like portions 10a and 10b to be also similarly bent along the lines connecting the respective bottoms of the small and large incisions 10' and 10" opposing each other on both lateral sides of the axis and defining respective root parts of the wing-like portions 10a and 10b, at the time of the fitting of the device to the hard palate. Therefore, the thus gradually bent wing portions 10a and 10b and tip portion 10c will render the middle portion between them will render the entire base board member 10 including the middle portion between the respective portions 10a to 10c to be curved with a relatively large curvature as a whole so as to be easily and intimately fittable to the hard palate. As the respective portions 10a, 10b and 10c will contact the hard palate surface with a force acting in their developing direction with their own restoring force of the resilient plastic sheet, the artificial palate device of the present invention manufactured with this base board member 10 as will be described later can maintain by itself its position fitted intimately to the hard palate surface without requiring any special holding means.

The incisions 10' and 10" are not always necessary. If the outer shape of the base plate member, particularly at the top and bottom sides of the trapezoid, is properly formed so that the entire base board member can be easily fitted to the hard palate, the incisions may be omitted.

On one surface of the above described base board member 10, any required number and arrangement of tongue contact sensing electrodes 11a and 11b, lead wired 12a and 12b connected respectively at one end to the electrodes and led from the electrodes in the top and middle portions to the rear end edge of either of the both wing portions 10a and 10b and from the electrodes in each of the wing-like portions to the rear end edge of the particular wing-like portion in which the electrodes are located, and both wing terminal groups 13a and 13b arranged along the respective rear end edges and connected respectively with the other ends of the lead wires 12a and 12b are provided by such proper method as a screen process printing with an electrically conductive material, an etching process printing performed with respect to a metal film prepared on the surface of the base board member by applying a conductive material or by means of a metal evaporation under a high vacuum or to a metal foil adhered. The base board member 10 having the sensing electrodes 11a and 11b, lead wires 12a and 12b and terminal groups 13a and 13b thus provided on one surface of the member is shown in FIG. 2.

Figure 3:
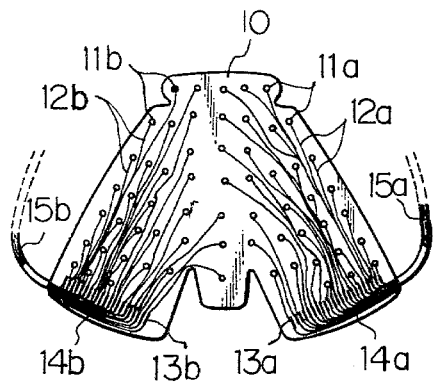
FIG. 3 is a plan view of the base board member as developed in a state where further lead wires electrically connecting the electrodes on the artificial palate device to the electropalatograph display device are connected to the base board member in FIG. 2.

Referring to FIG. 3, in the above described base board member 10, conductors of a plurality of insulation coated lead wires 14a and 14b exposed at their one end by removing the insulation coating are connected by such means as welding respectively to each of the terminals 13a and 13b arranged respectively along the rear end edges of the both right and left wing portions 10a and 10b, the wires 14a and 14b are collected in the respective corners at the outer rear ends of the both wing portions along the respective rear end edges and are extended as right and left lead wire cords 15a and 15b. Though not illustrated, the respective cords 15a and 15b are connected respectively at the extended ends to each of a pair of sockets having terminals connected to the other ends of the wires 14a and 14b and arranged in an order corresponding to the positions of the sensing electrodes.

Figure 4:
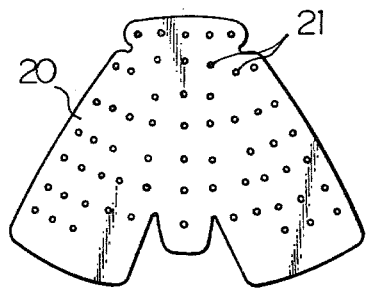
FIG. 4 is a developed plan view of a coating plate member for coating the base board member of FIG. 3 except the sensing electrodes.
Figure 5A:
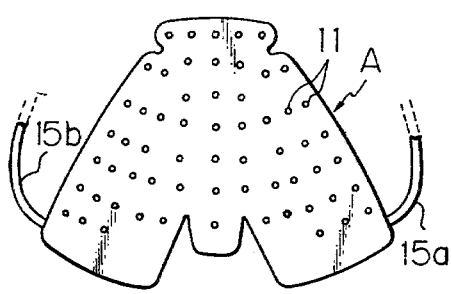
FIG. 5A is also a developed plan view of the artificial palate device in completed state where the base board member of FIG. 3 is coated with the coating plate member in FIG. 4.
Figure 5B:
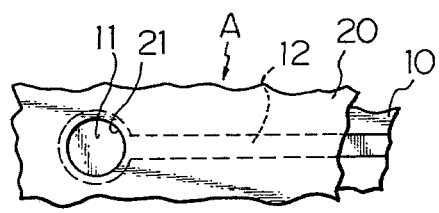
FIG. 5B is a fragmental plan view as magnified for showing one of the sensing electrodes and a part of the lead wire connected thereto in the device of FIG. 5A.

FIG. 4 shows a coating member 20 substantially of the same shape and size as of the base board member 10 shown in FIG. 2 and made, conveniently, of the same material of plastic film. This coating member 20 is provided with through holes 21 in respective positions corresponding to the sensing electrodes 11a and 11b of the base board member 10, and is preferably reduced in the thickness to be thinner than the base board member 10. This coating member 20 is laminated with a bonding agent or the like on the base board member 10 shown in FIG. 3 to cover all the parts except the sensing electrodes. An artificial palate device A according to the present invention as completed with this lamination is shown in FIG. 5A. The relations of the electrode 11 on the base board member 10, the lead wire 12 connected thereto and through hole 21 in the coating member 20 are shown in FIG. 5B as magnified.

In the above described embodiment, it is possible that, instead of using the coating member 20, the entire surface of the base board member except the surfaces of the sensing electrodes 11 is coated with a proper nontoxic synthetic resin which is flexible even after being curved. Further, in this embodiment, it is shown to provide many sensing electrodes only on one surface of the artificial palate device A, with which the trainee's tongue contacts during the training, but it is of course possible that, if required, one electrode is provided on the other surface to be in contact with the hard palate and a lead wire connected to it can be provided by a proper means such as described above.

The artificial palate device A according to the above embodiment is formed of the base board member 10 as a main body made of a flexible plastic sheet having a shape and size adaptable to the hard palate of general trainees as described above, so that the device can be easily fitted to any trainee's hard palate and can be held in close contact with the surface of the hard palate by the self restoring force of the device. If required, however, a proper amount of such holding agent as an artificial tooth stabilizer available in the market may be applied to the back surface, that is, the surface to be brought into contact with the hard palate and the device is pressed by hand against the hard palate, it will be able to be stably held in position.

Figure 6:
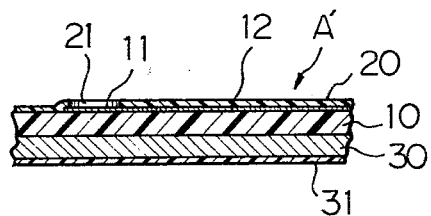
FIG. 6 is a fragmental sectioned view as magnified of another embodiment of the present invention, specifically showing its structure substantially at the same part as that shown in FIG. 5B.

Another embodiment of the present invention shall be explained with reference to FIG. 6. The artificial palate device A' formed by this embodiment primarily comprises the base board member 10 of the flexible plastic sheet made in the same manner as in the case of the above described embodiment, electric sensing elements including essentially the sensing electrodes 11 provided on one surface of the base board member and lead wires 12 connecting between these electrodes 11 and the terminals 13, and the laminated coating member 20 coating the elements except the surfaces of the sensing electrode 11. Then, as a feature of the device A' according to this embodiment, a metal foil 30 of, for example, aluminum or tin and preferably having the same shape and size as the before described base board member 10 is laminated by such proper means as adhereing on the other surface of the base board member 10. It is preferable to make the thickness of this metal foil 30 to be about 50 microns in the case of the base board member 10 having the thickness of about 25 to 50 microns. The material and thickness of this metal foil are so selected that the lamination of the base board member 10 and metal foil 30 can be easily deformed manually to be fitted to the trainee's hard palate surface. On the surface of the thus laminated metal foil 30, a protective member 31 consisting of a plastic film made preferably of the same material as of the coating member 20 is laminated so as to cover the entire surface as well as the peripheral edge surface of the metal foil 30 and to insulate the metal foil from moisture and electricity.

In the case of using the artificial palate device provided with the electrode on the surface to be in contact with the hard palate of the device as described in the foregoing for the purpose of applying therethrough a signal voltage to the trainee's body or the like, the metal foil 30 may be utilized as the particular electrode. In such case, the protective member 31 may be omitted or can be laminated so as to expose only a required portion of the metal foil 30. Further, instead of making the metal foil in the same size as of the base board member 10 and laminating it on the entire surface of the member including the case of using the metal foil 30 as the electrode, the metal foil may be made in a shape similar to but smaller in the size than that of the base board member so as to be provided only in an inner area surrounded by a marginal line substantially parallel with the peripheral edge of the base board member or only in a partial zone expanding substantially from the middle portion of the base board member to, for example, a portion substantially in the middle of the respective wing-like portions.

According to this embodiment, the artificial palate device A' of the present invention is formed mainly of a lamination of the flexible base board member 10 and easily deformable metal foil 30, and can be, therefore, easily deformed from a flat developed state to a curved state so as to be intimately fitted to the hard palate of the trainee. This metal foil has a property of remaining in a deformed form so that, in addition to that the device can be easily pressed manually intimately against the hard palate surface, the device A' will retain its fitted states as deformed so as to be well kept in such intimately fitted state stably over a long use. While, in the case of the first embodiment shown in FIGS. 2 to 5, further, the self restoring force of the base board member 10 acting as a self retaining force to the fitted state of the device A will give the user a feel of pressure urged on the hard palate during the use and, therefore, the flexibility or thickness of the base board member 10 should be selected properly so that this pressing feel will not be unpleasant or an obstacle for the phonation or speech during the use, the deformed state retaining property of the metal foil 30 in the device A' of the embodiment of FIG. 6 will be effective to control the self restoring force of the flexible base board member and will reduce the pressing feel during the use. However, in an event where the deformed state retaining property of the metal foil is such that it perfectly cancels the resilient restoring force of the base board member, the initially fitted form of the device A' may be further deformed and the self retaining force to the hard palate surface of the device A' will be likely to be reduced. To avoid this, it is preferable that the flexible restoring force of the base board member should be selected to be at least equal to or a little higher than the deformed state retaining force of the metal foil so that, during the speech training for a relatively long period, the device A' will restore from the initial fitted state to a certain extent so as to maintain the close contact with the hard palate surface against any force given by repetitions of mutual movements of the tongue and hard palate for speech actions.

As has been described above, the artificial palate device for electropalatograph according to the present invention is formed, as the main body, of the flexible base board member of a shape and size adaptable to an average hard palate shape of general users and can be manufactured without using any gypsum mold taken from the specific hard palate of individual users, so that the base board members of several different sizes can be prepared and can be manufactured in advance with the electrodes, lead wires, terminals and cords connected to the terminals, in the form of completed products for ready use, whereby one of such completed products of a size adapted to a specific trainee can be selected, the artificial palate device of the present invention can be perfectly mass-produced and the production cost can be greatly reduced. Further, the holding means of wires which has been indispensable to fixing and holding in the using position the artificial palate device of a shape made by the conventional molding to perfectly fit the hard palate shape is no longer required in the present invention. The device will be maintained in the using position by the own flexibility of the base board member, the self restoring force due to the flexibility and the deformed state retaining force of the easily deformable metal layer laminated on the base board member, whereby any unpleasant feel during the use will be greatly reduced. Thus the contribution of the present invention to the electropalatograph technique by these advantages is remarkable, in addition to the practical advantages achieved in the manufacture of the artificial palate device as described above.

What we claim as our invention is:

1. An artificial palate device for use in electropalatograph speech training and the like comprising a flexible electrically insulative base board substantially in the shape and dimensions of a human hard palate, a plurality of tongue contact sensing electrodes provided as spaced from each other on one surface of said base board, a plurality of lead wires corresponding in number to said electrodes and provided on said one surface of the base board, said lead wires being connected respectively at one end to each of the electrodes and led out of the base board as insulated from each other and from other electrodes, and means for covering substantially the said one surface of the base board and having a plurality of through holes made at positions corresponding to those of the electrodes for exposing at least a part of the respective electrodes out of said layer, said device being capable of intimately fitting a human hard palate and being retained therein.

2. The device according to claim 1 wherein said base board is substantially trapezoidal in shape, said base board including a tip portion to be positioned inside front teeth when the device is fitted to the hard palate surface, a first pair of incisions adjacent said tip portion and at opposite ends of said tip portion, said first pair of incisions being symmetrical to each other with respect to an axial line passing through the center of said base board from the shorter top edge of said board to the longer bottom edge of said board, an expanded portion adjacent said first pair of incisions to be fitted to the hard palate surface between the side innermost teeth, and a second pair of incisions in said expanded portion adjacent and symmetrical to each other with respect to said axial line and said means for covering said one surface of said base board corresponds in shape to the shape of said base board.

3. The device according to claim 1 wherein said covering means comprises an electrically insulative material and the base board has a thickness of about 25 to 50$\mu$.

4. The device according to claim 1 wherein said base board has a thickness of about 25 to 50$\mu$, said covering means comprises a metal foil having a thickness of about 50$\mu$ and is capable of maintaining a deformed state when curved so as to restrict the self-restoring force of the board.

5. The device according to claim 4 wherein said metal foil is aluminum.

6. The device according to claim 4 wherein said metal foil is tin.

* * * * *